United States Patent
Mahar et al.

(10) Patent No.: US 10,527,308 B2
(45) Date of Patent: Jan. 7, 2020

(54) ALARM-CLOCK TRIGGERED SYSTEMS

(71) Applicant: Vivint, Inc., Provo, UT (US)

(72) Inventors: Matthew Mahar, South Jordan, UT (US); Matthew J. Eyring, Provo, UT (US); Clint H. Gordon-Carroll, Highland, UT (US); Jeremy B. Warren, Draper, UT (US); James E. Nye, Alpine, UT (US); Jefferson H. Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/964,797

(22) Filed: Apr. 27, 2018

(65) Prior Publication Data
US 2018/0313565 A1     Nov. 1, 2018

Related U.S. Application Data

(63) Continuation of application No. 14/961,658, filed on Dec. 7, 2015, now Pat. No. 9,958,180.

(51) Int. Cl.
| | |
|---|---|
| *F24F 11/62* | (2018.01) |
| *G05B 15/02* | (2006.01) |
| *G05D 23/19* | (2006.01) |
| *F24F 11/30* | (2018.01) |
| *F24F 110/10* | (2018.01) |

(Continued)

(52) U.S. Cl.
CPC ............. *F24F 11/62* (2018.01); *F24F 11/30* (2018.01); *G05B 15/02* (2013.01); *G05D 23/1904* (2013.01); *F24F 11/61* (2018.01); *F24F 11/66* (2018.01); *F24F 2110/10* (2018.01); *G05B 2219/2642* (2013.01)

(58) Field of Classification Search
None
See application file for complete search history.

(56) References Cited

U.S. PATENT DOCUMENTS

| | | | |
|---|---|---|---|
| 4,475,685 | A | 10/1984 | Grimado et al. |
| 8,374,725 | B1 | 2/2013 | Ols |
| 8,761,050 | B2 | 6/2014 | Lu et al. |

(Continued)

FOREIGN PATENT DOCUMENTS

| | | |
|---|---|---|
| JP | 2530475 Y2 | 3/1997 |
| KR | 20120045452 A | 5/2012 |

OTHER PUBLICATIONS

PCT International Search Report for International Application No. PCT/US2016/062100, dated Mar. 6, 2017 (3 pp.).

*Primary Examiner* — Carlos R Ortiz Rodriguez
(74) *Attorney, Agent, or Firm* — Holland & Hart LLP

(57) ABSTRACT

In some embodiments, security and/or automation systems, collectively referred to as automation systems, may offer a user the comforts of automatically controlling HVAC settings based at least in part on an alarm. The automation system may provide automatically meet desired HVAC conditions at select times and provide a more comfortable living situation. In some embodiments, the increased comfort level may enable or ease household activities. For example, if a person sleeps with a cooler temperature, it may be harder for the person to get out of bed. But an automated HVAC system may adjust the temperature such that when a person desires to wake up, the temperature is comfortable and may ease a transition from day to night.

20 Claims, 8 Drawing Sheets

(51) Int. Cl.
*F24F 11/66* (2018.01)
*F24F 11/61* (2018.01)

(56) References Cited

U.S. PATENT DOCUMENTS

| | | |
|---|---|---|
| 2007/0067300 A1* | 3/2007 | Ollis .................. H04L 12/2829 |
| 2009/0282357 A1 | 11/2009 | Schultz et al. |
| 2012/0290138 A1* | 11/2012 | DiFulgentiz ........... G05D 23/19 |
| | | 700/278 |
| 2013/0073094 A1* | 3/2013 | Knapton ................ G05B 13/02 |
| | | 700/278 |
| 2014/0091731 A1 | 4/2014 | Fushimi |
| 2014/0156097 A1 | 6/2014 | Nesler et al. |
| 2014/0316586 A1 | 10/2014 | Boesveld et al. |
| 2015/0070163 A1 | 3/2015 | Bennett et al. |
| 2015/0185261 A1 | 7/2015 | Frader-Thompson et al. |

* cited by examiner

ALARM-CLOCK TRIGGERED SYSTEMS

CROSS REFERENCE

The present Application is a continuation of U.S. patent application Ser. No. 14/961,658, titled "ALARM-CLOCK TRIGGERED SYSTEMS," filed on Dec. 7, 2015, now U.S. Pat. No. 9,958,180, the disclosure of which is incorporated herein by this reference.

The present disclosure, for example, relates to security and/or automation systems, and more particularly to alarm-clock triggered systems.

Security and automation systems are widely deployed to provide various types of communication and functional features such as monitoring, communication, notification, and/or others. These systems may be capable of supporting communication with a user through a communication connection or a system management action.

People often have different desirable waking settings for their HVAC systems and household. A person may adjust HVAC settings to reduce energy usage during the day, set a more comfortable sleeping temperature, set a comfortable occupancy temperature, and the like. But if an HVAC system is manually adjusted, the time it may take for the temperature to reach a desired stage may result in an uncomfortable situation for an occupant of a house. Or a person may forget to or be too busy to manually adjust a system. Additionally, the person's preferences may not be desirable for multiple reasons. Thus, there exists a need in the art for improved alarm-triggered systems and methods.

SUMMARY

In some embodiments, security and/or automation systems, collectively referred to as automation systems, may offer a user the comforts of automatically controlling HVAC settings. The automation system may provide a user with the ability to automate portions of HVAC controls to automatically meet desired HVAC conditions at select times. This may provide a more comfortable living situation for a person and a household. In some embodiments, the increased comfort level may enable or ease household activities. For example, if a person sleeps with a cooler temperature, it may be harder for the person to get out of bed. However, an automated HVAC system may adjust the temperature such that when a person desires to wake up, the temperature is comfortable and may ease a transition from day to night. In addition, the adjustment and/or modification may be automatic and based on one or more conditions, such as an alarm or a wake-up time, so the system operates independently and does not require user monitoring.

In some embodiments, a method for security and/or automation systems is described. The method may include calculating a temperature adjustment time of a room in a residence and/or detecting an alarm activation time on an alarm device. The method may include determining an adjustment time to automatically adjust a temperature setting based at least in part on the temperature adjustment time and/or the alarm activation time and automatically adjusting the temperature setting based at least in part on the adjustment time.

In some embodiments, determining the adjustment time to automatically adjust the temperature setting may include receiving the temperature setting from a user. In some embodiments, calculating the temperature adjustment time may include receiving information to alter the temperature setting of the residence and/or determining a length of time to reach the temperature. In some embodiments, calculating the temperature adjustment time may include determining an outdoor temperature proximate the residence and adjusting the adjustment time based at least in part on determining the outdoor temperature.

The method may, in some embodiments, include dynamically adjusting a lighting of the room based at least in part on the alarm activation time. The method may include readjusting the temperature setting after a predetermined time period. In some embodiments, readjusting the temperature setting may reduce energy usage. The method may predict a wake time of a user based on the alarm activation time. The method may predict a wake time of a user based on other inputs and/or factors.

In some embodiments, the method may include tracking a temperature change request for each of multiple rooms. In some embodiments, the method may calculate a time for each temperature change request to complete and generate a repository of time to automatically complete temperature changes for multiple rooms based at least in part on the tracking and/or the calculating. A second alarm activation time may, in some embodiments, be detected on a second alarm device. The method may determine the adjustment time to automatically adjust the temperature setting based at least in part on the temperature adjustment time and/or the second alarm activation time, and automatically adjusting the temperature setting based at least in part on the adjustment time and/or the second alarm activation time.

In some embodiments, an apparatus for security and/or automation systems is described. The apparatus may include a processor, memory in electronic communication with the processor, and instructions stored in the memory. The instructions may be executable by the processor to calculate a temperature adjustment time of a room in a residence, detect an alarm activation time on an alarm device, determine an adjustment time to automatically adjust a temperature setting based at least in part on the temperature adjustment time and/or the alarm activation time, and/or automatically adjust the temperature setting based at least in part on the adjustment time.

In another embodiment, a non-transitory computer-readable medium storing computer-executable code is described. The code may be executable by a processor to calculate a temperature adjustment time of a room in a residence, detect an alarm activation time on an alarm device, determine an adjustment time to automatically adjust a temperature setting based at least in part on the temperature adjustment time and the alarm activation time, and/or automatically adjust the temperature setting based at least in part on the adjustment time.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, security and/or automation systems, collectively referred to as automation systems, may offer a user the comforts of automatically controlling household setting, including but not limited to HVAC settings. A system may automate portions of a household to wake to optimal conditions. Some of the controls may include HVAC controls to automatically meet desired HVAC conditions at select times, among others. For example, a user may link HVAC controls and/or adjustments to an alarm-clock. This may provide the user with the ability to continuously wake up to the desired temperature without the need to re-program the HVAC controls every day or when a schedule shift and/or change occurs. Reprogramming the HVAC controls may also not be able to be done on a one-time basis, the user may mis-program the HVAC controls, or forget to program the setting. For example, the user may set the bedroom to heat sooner than actually desired which may cause the user to wake earlier than desired. The present systems and methods may adjust the temperature such that when a person desires to wake up, the temperature is comfortable and may ease a transition from day to night. The user may additionally program other household-related functions such as lighting, kitchen functions, bathroom functions, and the like.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
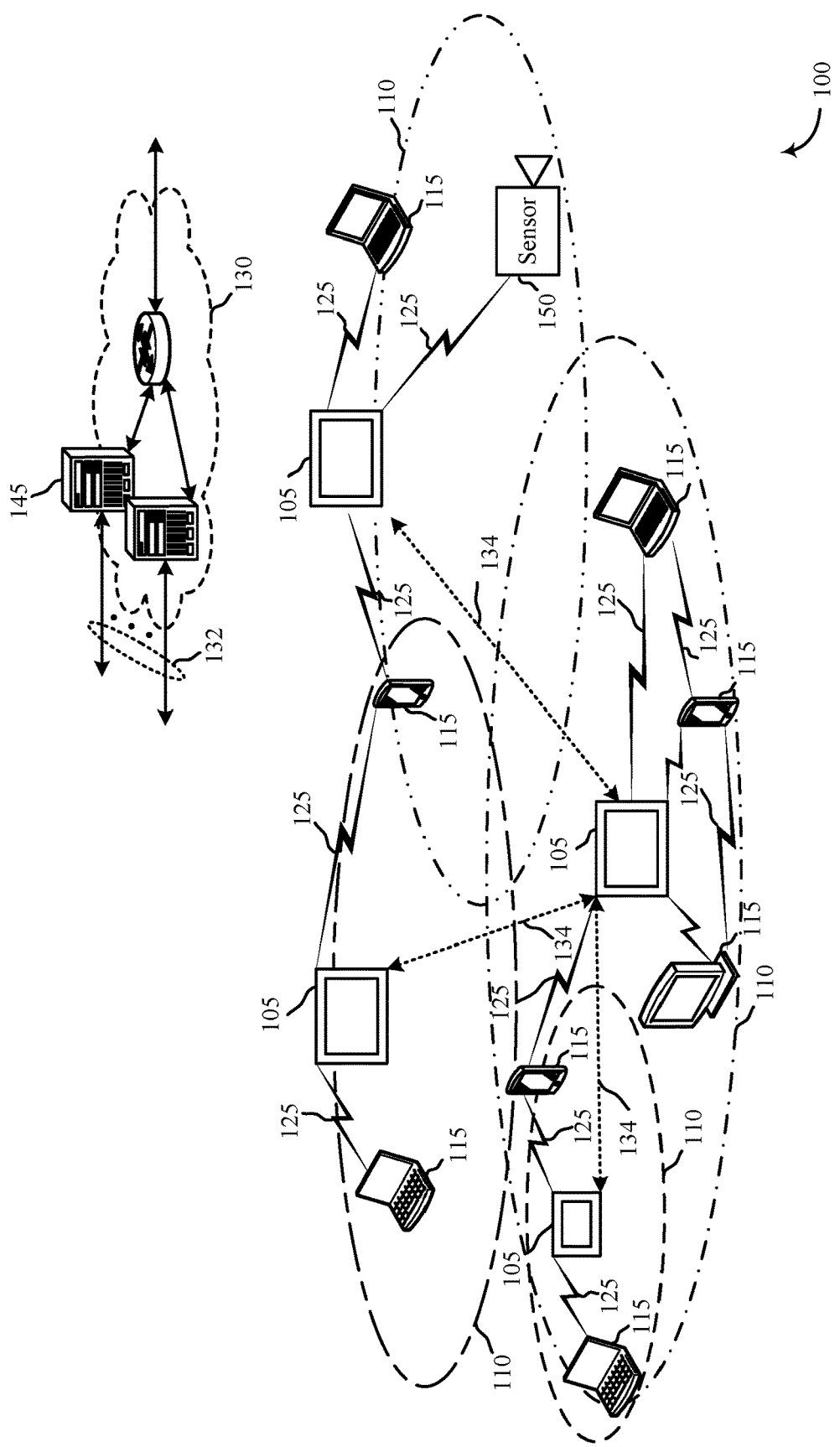
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, and/or sensors 150. The network 130 may provide user authentication, encryption, access authorization, tracking, Internet Protocol (IP) connectivity, and other access, calculation, modification, and/or functions. The control panels 105 may interface with the network 130 through a first set of wired and/or wireless communication links 132 to communicate with one or more remote servers 145. The control panels 105 may perform communication configuration, adjustment, and/or scheduling for communication with the devices 115, or may operate under the control of a controller. In various examples, the control panels 105 may communicate—either directly, or indirectly (e.g., through network 130)—with each other over a second set of wired and/or wireless communication links 134. Control panels 105 may communicate with a backend server (such as the remote servers 145)—directly and/or indirectly—using the first set of one or more wireless communication links 132.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input-multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, the devices 115 and/or the control panels 105 may incorporate and/or receive notification from a waking alarm system, i.e., an alarm system to generate a visual and/or an audio alert to alert a person of a specific time, such as a waking time after a night of rest. The devices 115 and/or the control panels 105 may include one or more waking alarm systems. The waking alarm systems may be linked to specific users, groups or subsets of users, and/or specific bedrooms and/or other rooms in a residence. The waking alarm system may communicate with and/or be coupled to the HVAC system—directly and/or indirectly, such that the HVAC system may automatically adjust a specific room and/or a group of rooms based at least in part on a time set for the waking alarm system. Adjusting specific room temperatures may require tracking temperature changes in the specific room to appropriately time the temperature adjustments. The waking alarm system may communicate with and/or be coupled to other systems in a residence to automate other features for a more relaxing waking setting.

Figure 2:
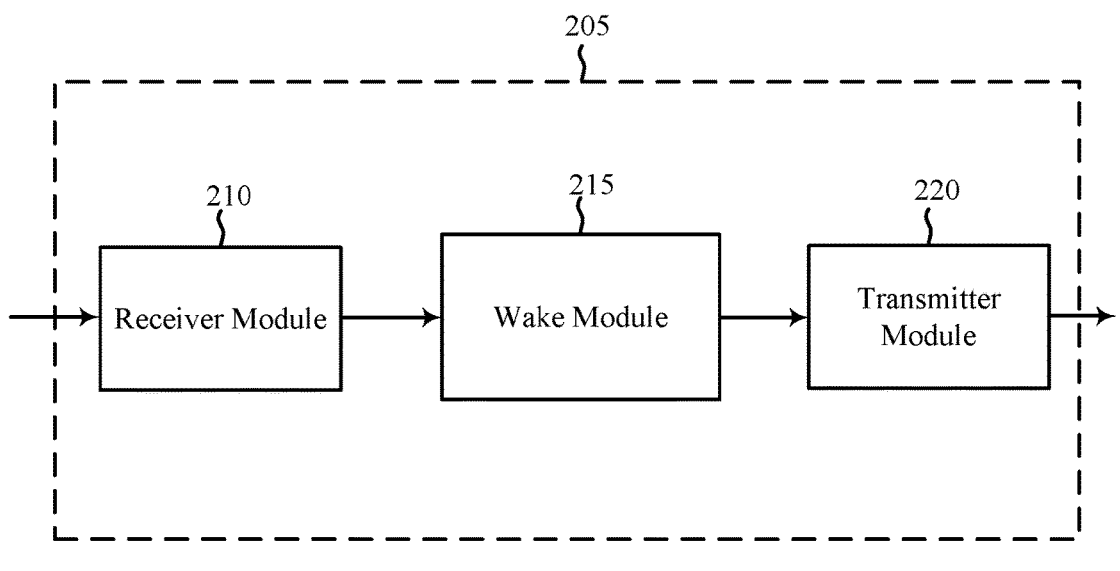
FIG. 2 shows a block diagram of a device relating to a security and/or an automation system, in accordance with various aspects of this disclosure.

FIG. 2 shows a block diagram 200 of a device 205 for use in electronic communication, in accordance with various aspects of this disclosure. The device 205 may be an example of one or more aspects of a control panel 105 and/or device 115 described with reference to FIG. 1, among others. The device 205 may include a receiver module 210, a wake module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive input from a user and/or another device about an alarm-clock function. For example, the receiver module 210 may receive information regarding a desired waking temperature or a desired set temperature linked to a time-based alarm. The information may be user specific, may be based on a predetermined and/or default setting, or may be specialized to the entire household. Information may be passed on to the wake module 215 and/or to other components of the device 205 and/or other components of a communications system (e.g., communications system 100).

The wake module 215 may initiate the control of the heating ventilation and air conditioning for a residence. The wake module 215 may be a learning module that responds to past actions, and/or user and/or system behavior and/or performance, or may be set to alter the HVAC settings of a residence at select times. For example, the wake module 215 may predict a waking time of a user based on previous waking times when no alarm-clock is set. In some embodiments, the wake module 215 may be a smart module and may pull information to automatically adjust to a user's schedule. For example, the wake module 215 may link to a waking alarm system (i.e., an alarm-clock system) which may enable the HVAC system to automatically adjust an HVAC setting based on one or more alarm settings of the alarm clock. For example, a user may change the settings of an alarm-clock daily. The user may be a person with a varying schedule and continuously resetting an HVAC setting may be cumbersome and burdensome. The user may not remember and the result may be a less than desirable waking temperature.

The transmitter module 220 may transmit the one or more signals received from other components of the device 205 and/or components of a communications system (e.g., communications system 100). The transmitter module 220 may transmit one or more signals—directly and/or indirectly—to initiate an HVAC system to adjust the HVAC controls at a specific time and/or based on one or more conditions. In some examples, the transmitter module 220 may be collocated with the receiver module 210 in a transceiver module.

Figure 3:
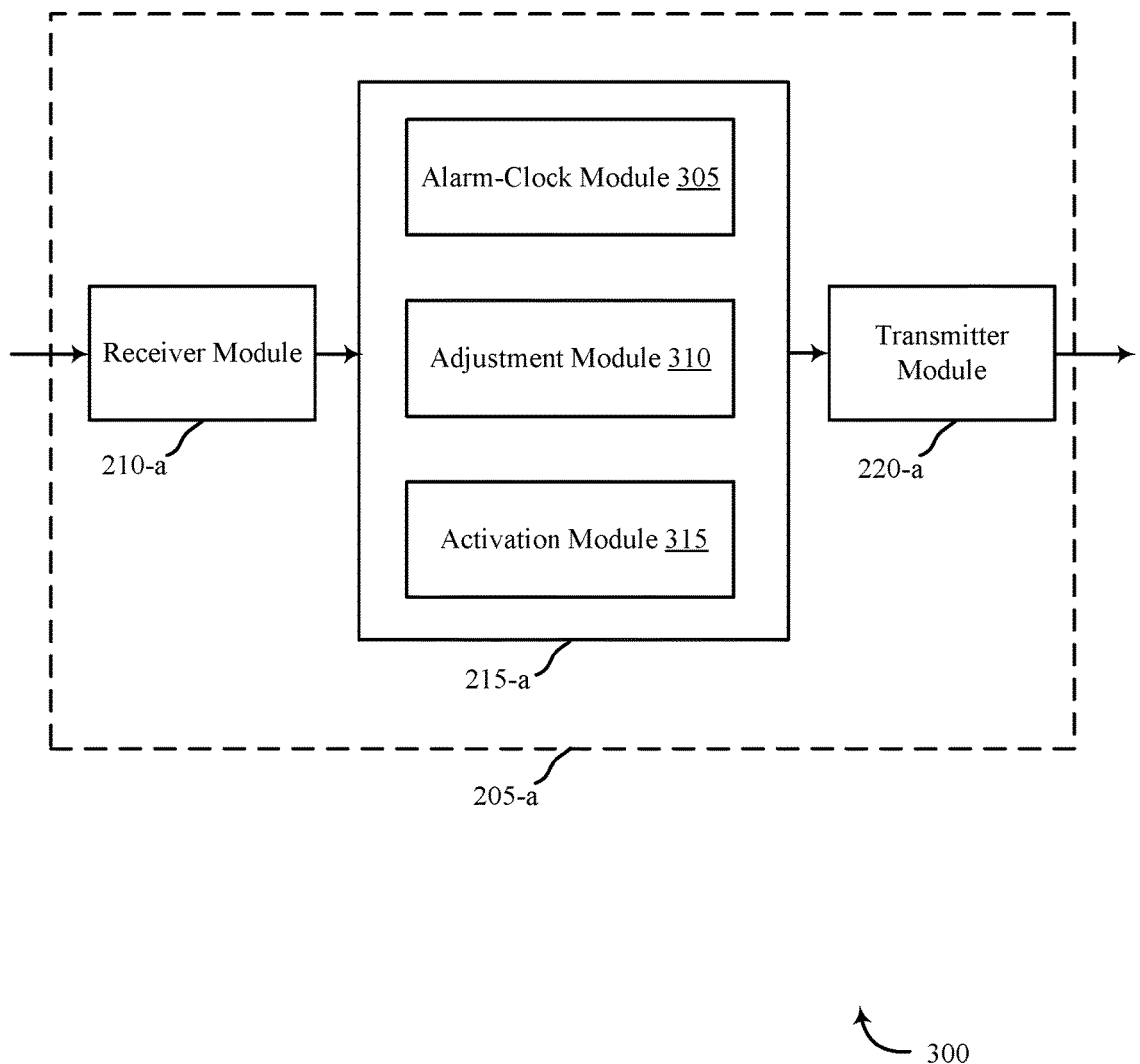
FIG. 3 shows a block diagram of a device relating to a security and/or an automation system, in accordance with various aspects of this disclosure.

FIG. 3 shows a block diagram 300 of a device 205-a for use in wireless communication, in accordance with various examples. The device 205-a may be an example of one or more aspects of a control panel 105 described with reference to FIGS. 1 and/or 2, among others. It may also be an example of a device 205 described with reference to FIG. 2, among others. The device 205-a may include a receiver module 210-a, a wake module 215-a, and/or a transmitter module 220-a, which may be examples of the corresponding modules of device 205. The device 205-a may also include a processor. Each of these components may be in communication with each other. The wake module 215-a may include an alarm-clock module 305, an adjustment module 310, and/or an activation module 315. The receiver module 210-a and the transmitter module 220-a may perform the functions of the receiver module 210 and the transmitter module 220, of FIG. 2, respectively.

The components of the device 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The alarm-clock module 305 may receive input from a user, a device, and/or a component to set an audible, visual, and/or audio-visual alarm. The alarm may change daily or the user may have the option to set a recurring alarm for specific days. The alarm-clock module 305 may request input from the user about desired waking conditions. For example, the user may wish for the bedroom to be set to a specific temperature at the alarm time or at after a certain period before and/or after the alarm time. A user may wish for other actions to take place in relation to an alarm and may have the option of additionally customizing their waking experience. For example, a user may set a lighting function, a coffee-pot, perhaps open/unlock a dog-door, and/or turn on a news television station or radio station. The user may wish for a shower to begin running at a specific time or for a bathroom light to turn on. In some embodiments, these waking experience functions may be based at least in part on the alarm time, a snooze of the alarm time, when the room and/or the premises has reached a desired temperature, some combination, and/or other factors. For example, a user's lamp or bathroom light may turn on before or after a user's alarm time and/or when a temperature has reached a predetermined value. The alarm-clock module 305 may be linked to a specific user, a user's profile (including but not limited to an automation system profile), a user's electronic calendar (tracking her first appointment and/or meeting of the day), a bedroom, an area of a home (e.g., a top floor, a main floor, a west end) or may be proximate to and/or in communication with a control panel of an automation system. The user may then select the specific room for an alarm-clock and associated actions to trigger. In another embodiment, the user may enter the information in an alarm-clock device in their bedroom.

The adjustment module 310 may track the changes in temperatures in a residence as a whole and/or in particular rooms (or sections of rooms). In some embodiments, the tracking may include changes made to the HVAC settings, a timing for the changes to take effect, and/or a priority for the changes. For example, the adjustment module 310 may determine the timing of an HVAC change, the degree of change, and the time to completion. The degree of the change may be the difference between a desired temperature and a current temperature. The time to completion may be the time it takes the current temperature to meet the desired temperature. In some embodiments, this tracking may be done room to room, room section by room section, and/or based on a user's location, even though the HVAC system may control multiple rooms. The room to room tracking may provide different results based on a size, geometry, and overall layout of a room and/or a residence. The room tracking may provide a transitional guidance or ratio as to degree change over time. In some embodiments, the change may link to external weather conditions and the adjustment module 310 should note any circumstances where the temperature transitions appear to change and if external weather conditions are the cause.

Once the transitional temperature information is known, the adjustment module 310 may automatically determine a temperature adjustment of a bedroom to reach a desired temperature in conjunction with at least one alarm. The adjustment module 310 may determine the transitional temperature information as well as user input to determine when to automatically adjust HVAC settings to reach a desired temperature in relation to an alarm activation time. For example, the automatic adjustment may adjust the temperature to reach the desired temperature a predetermined amount before an alarm time (e.g., five minutes before), at an alarm time itself, and/or after an alarm time (e.g., ten minutes after to correspond with a person emerging from a shower). The adjustment module 310 may auto-detect a desired temperature or may receive the desired temperature input from a user, another device, another communications system component, a predetermined setting, based on past adjustments, some combination, and/or other sources. The adjustment module 310 may have several profiles connecting one or more individuals to one or more alarm devices and each individual's desired waking temperature.

The activation module 315 may receive information from the alarm-clock module 305 and the adjustment module 310 and activate changes initiating the HVAC system based at least in part on input from the alarm-clock module 305 and/or the adjustment module 310. In some embodiments, the activation module 315 may use the timing calculations form the adjustment module 310 and an alarm setting from the alarm-clock module 305 to determine when to activate a change in the HVAC setting, after determining whether any change is required. The activation module 315 may additionally take one or more actions based on additional input(s) from the user and/or another source (e.g., a device, a calendar notification setting) when setting the alarm. For example, the activation module 315 may start a coffee pot, turn on a latte machine, begin a shower, and/or adjust one or more lighting settings. If a residence is equipped with in-floor heating and/or cooling, the activation module 315 may adjust one or more settings to adjust the in-floor heating and/or cooling. The activation module 315 may turn on a towel warmer for after the user showers. In some embodiments, the activation module 315 may send a daily weather report and/or calendar summary.

Figure 4:
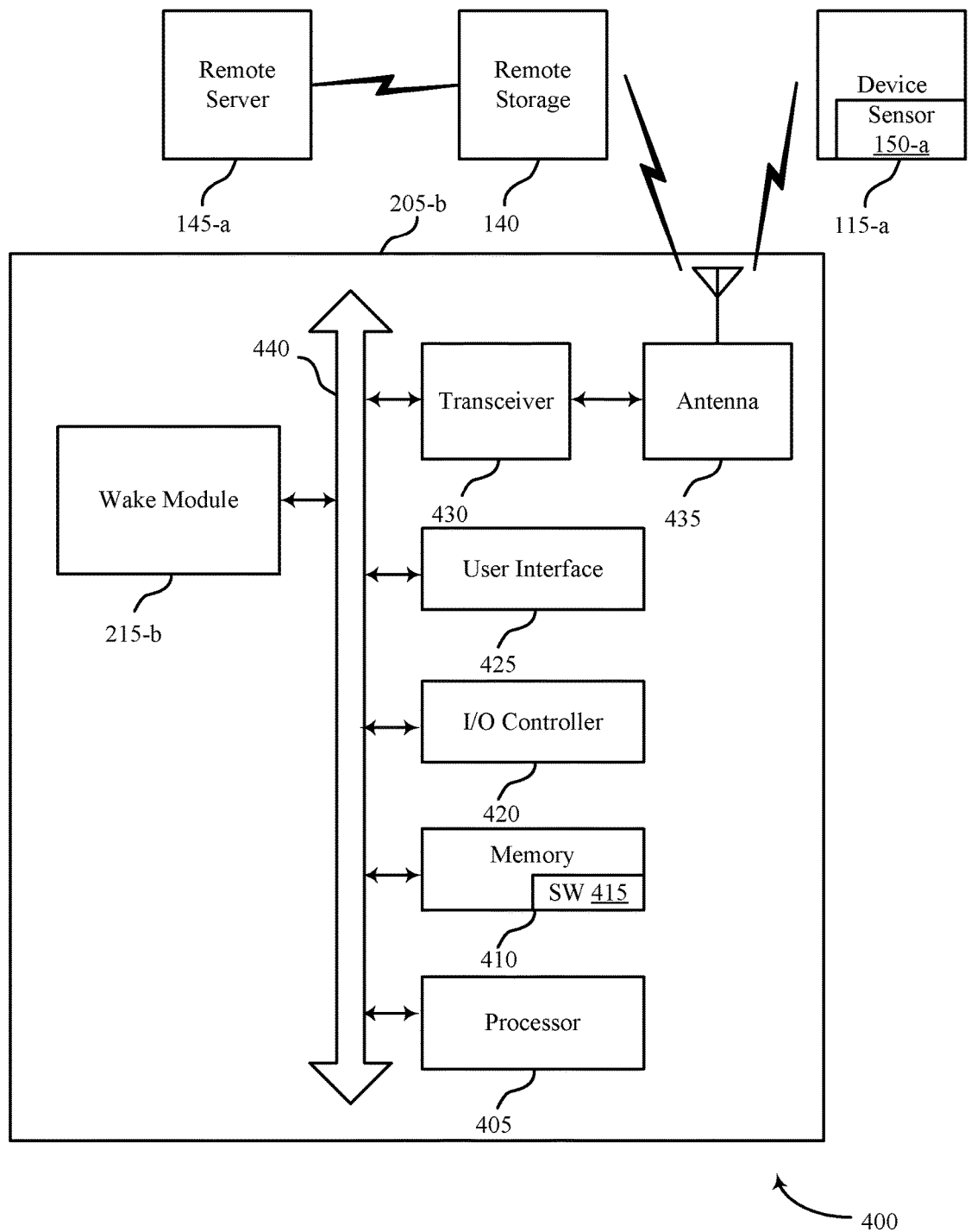
FIG. 4 shows a block diagram relating to a security and/or an automation system, in accordance with various aspects of this disclosure.

FIG. 4 shows a system 400 for use in alarm-clock triggered systems, in accordance with various examples. System 400 may include a device 205-b, which may be an example of the control panels 105 of FIG. 1, among others. Device 205-b may also be an example of one or more aspects of device 205 and/or 205-a of FIGS. 2 and 3, among others.

Device 205-b may also include components for bi-directional voice and data communications including components for transmitting communications and components for receiving communications. For example, device 205-b may communicate bi-directionally with one or more of device 115-a, one or more sensors 150-a, remote storage 140, a control panel, and/or remote server 145-a which may be an example of the remote server of FIG. 1, among others. This bi-directional communication may be direct (e.g., device 205-b communicating directly with remote storage 140) or indirect (e.g., device 205-b communicating indirectly with remote server 145-a through remote storage 140).

Device 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While a device (e.g., 205-b) may include a single antenna 435, the device may also have multiple antennas 435 capable of concurrently transmitting or receiving multiple wired and/or wireless transmissions. In some embodiments, one element of device 205-b (e.g., one or more antennas 435, transceiver module 430, etc.) may provide a direct connection to a remote server 145-a via a direct network link to the Internet via a POP (point of presence). In some embodiments, one element of device 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through input/output controller module 420).

One or more buses 440 may allow data communication between one or more elements of device 205-b (e.g., processor module 405, memory 410, input/output controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive waking alarm information, detect an alarm activation time, determine adjustment parameters including time, initiating activation of an HVAC system, activate one or more household functions, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the wake module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on input/output controller module 420 may be iOS®, ANDROID®, MS-DOS®, MS-WINDOWS®, OS/2®, UNIX®, LINUX®, or another known operating system.

The device 205-b may include a wake module 215-b, which may perform the functions described above for the wake modules 215 of device 205 of FIGS. 2 and 3, among others.

Figure 5:
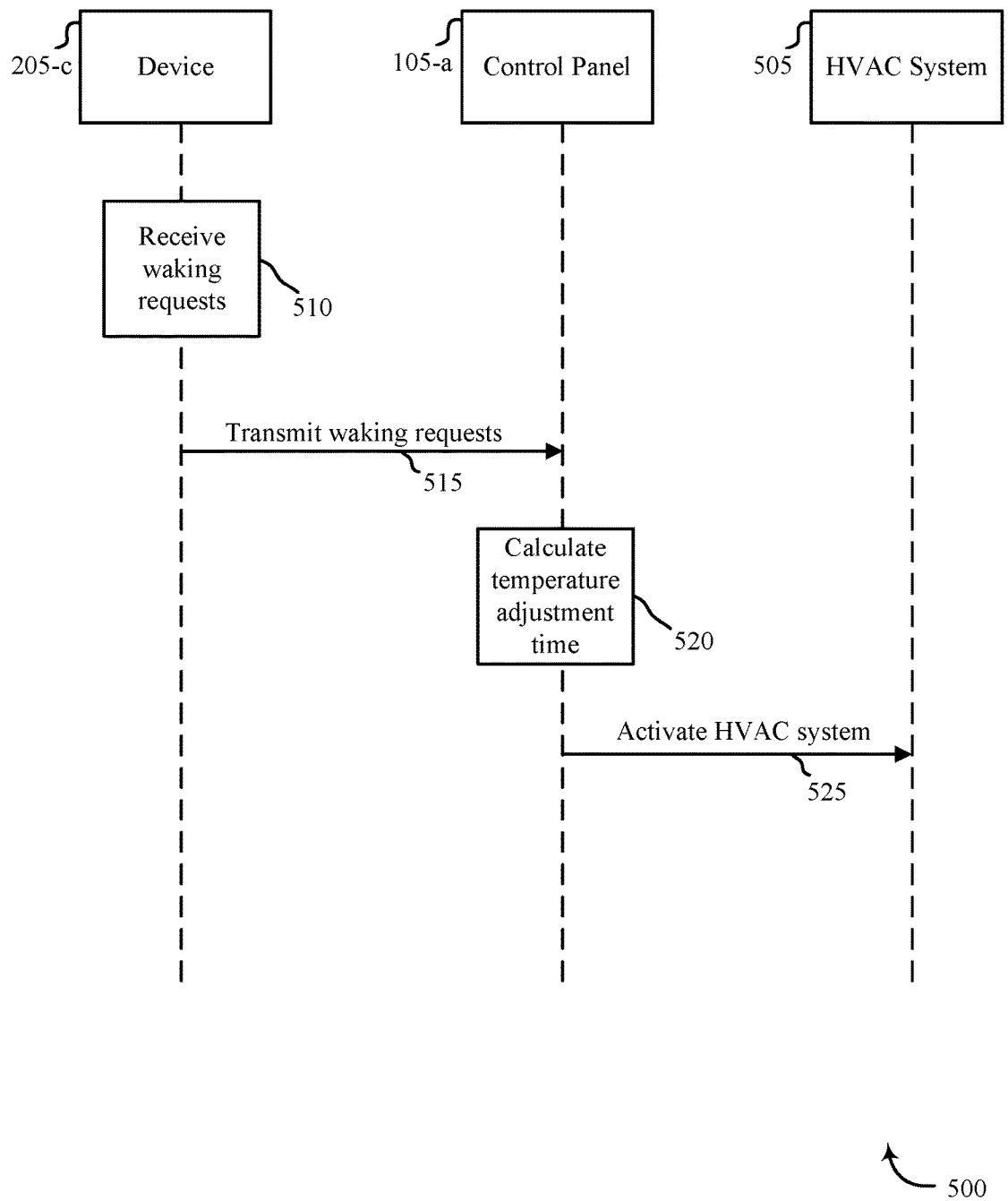
FIG. 5 is a swim diagram relating to a security and/or an automation system, in accordance with various aspects of this disclosure.

FIG. 5 is a swim diagram 500 illustrating communication relating to a device 205-c, HVAC system 505, and a control panel 105-a relating to an automation system. The device 205-c may be one example of the device 205 described with reference to FIGS. 2-4 and/or device 115, among others. The control panel 105-a may be one example of control panel 105 described with reference to FIG. 1 and may also be an example of the device 205 described with reference to FIGS. 2-4, among others. The HVAC system 505 may control the heating ventilation and air conditioning systems for a residence.

At block 510, the device 205-c may receive one or more waking requests relating to the present systems and methods. In some embodiments, the waking requests may comprise a time to set a waking alarm, lighting conditions, HVAC conditions, and other parameters. Other parameters may include, but are not limited to, adjusting radiant floor heating, a towel heater, starting a shower, turning on a latte machine, starting a coffee pot, heating water, and the like. In some embodiments, the device 205-c may transmit 515 the waking requests to a control panel 105-a. In some embodiments, if the waking requests are made at a control panel 105-a, the control panel 105-a may not receive them from a separate device 205-c. In other embodiments, the waking requests may be sent to a backend server for performing one or more operations, such as execution. The control panel 105-a may program and/or set all of the waking parameters. At block 520, the control panel 105-a may calculate a temperature adjustment time. In some embodiments, the temperature adjustment time may be a length of time it takes for a room to adjust from a current temperature to a desired temperature. In some embodiments, the control panel 105-a may then activate 525 the HVAC system 505 to the predetermined temperature adjustment time prior to a waking time. In some embodiments, some or all of these steps may be performed at and/or by device 205-c, control panel 105-a, a backend server, a component from a communications system (e.g., communications system 100), some combination, and/or others.

Figure 6:
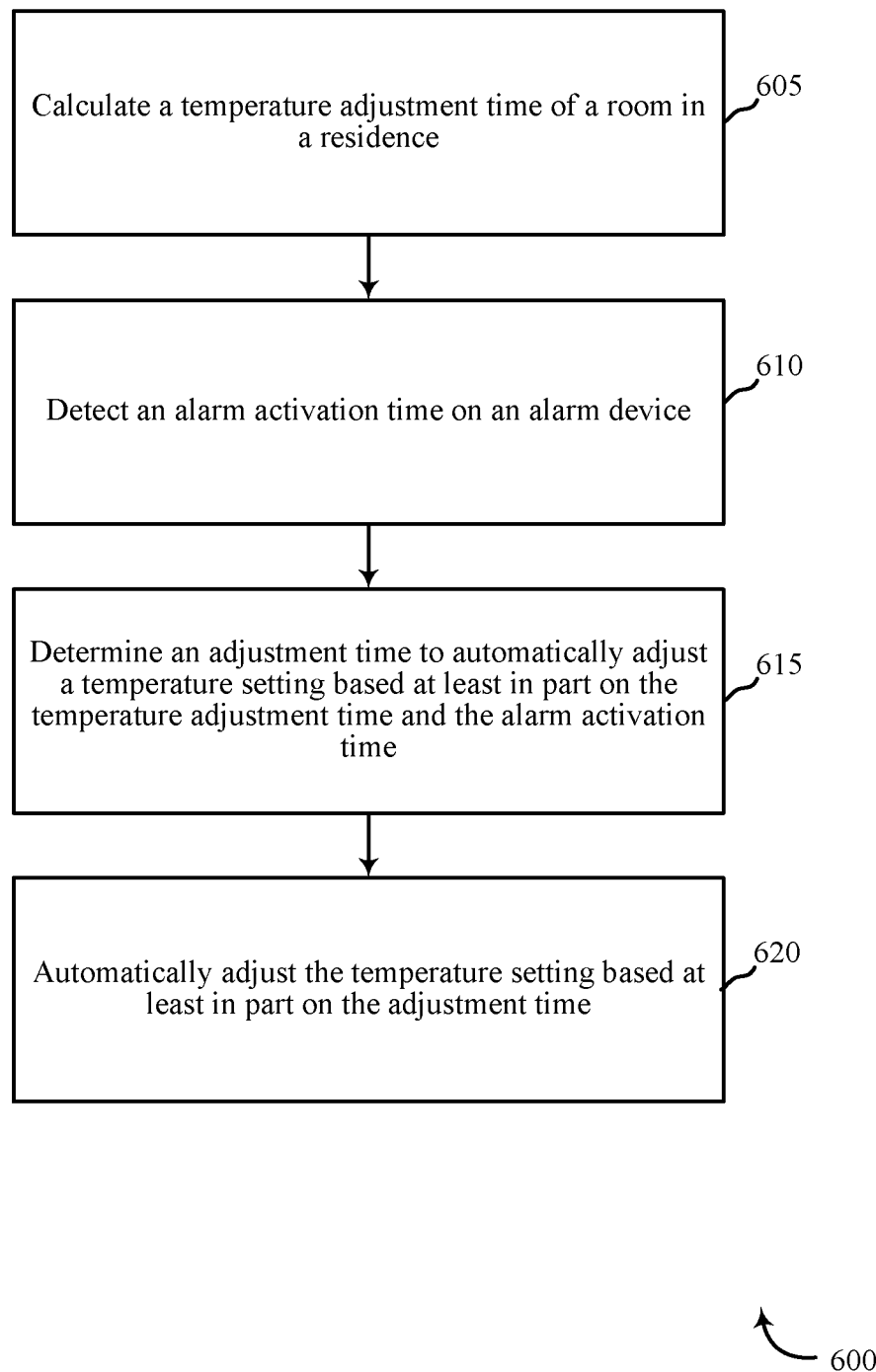
FIG. 6 is a flow chart illustrating an example of a method relating to a security and/or an automation system, in accordance with various aspects of this disclosure.

FIG. 6 is a flow chart illustrating an example of a method 600 for alarm-clock triggered systems, in accordance with various aspects of the present disclosure. For clarity, the method 600 is described below with reference to aspects of one or more of the devices 205 described with reference to FIGS. 2-5. In some examples, a backend server may execute one or more sets of codes to control the functional elements of the device 205 to perform the functions described below. Additionally or alternatively, the device 205 may perform one or more of the functions described below using special-purpose hardware and/or software.

At block 605, the method 600 may include calculating a temperature adjustment time of a room in a residence. The calculation may include inputs based on the size of the room (and/or one or more additional rooms or residence sections), the location of the room (and/or one or more additional rooms or residence sections), the number of HVAC related vents of the room (and/or one or more additional rooms or residence sections), a change in the degrees of the room (and/or one or more additional rooms or residence sections), past temperature change adjustments of the same and/or different rooms, some combination, and/or other factors. For example, the method 600 may track temperature input changes to the room and calculate a length of time for the change to be fully incorporated (i.e. a time for the new temperature to be reached). The method 600 may use the time and change in temperature to calculate a time per degree change for the specific room. Calculating the temperature adjustment time may include determining a desired temperature at a waking time for the user and a current temperature of the room. If the temperature of the room changes throughout a time period prior to the waking time of the user, the calculation may adjust accordingly.

The operations at block 605 may be performed using the adjustment module 310 described with reference to FIG. 3, among others.

At block 610, the method 600 may detect an alarm activation time, which may be based on an alarm device. The alarm device may be a waking alarm device, an alarm-clock, a mobile device, or the like. In some embodiments, the method 600 may link to a mobile device which may have an alarm function and all the features described with relation to the device (e.g. device 205) herein. In some embodiments, the alarm activation time may be set to a specific time each evening before a user wishes to wake up or may be a recurring time the user is able to set on her device. In some embodiments, the alarm activation time may be based on a user's electronic calendar or an appointment time and may determine, predict, and/or set an alarm time based at least in part on the electronic calendar or an appointment time. The method 600 may detect and determine the alarm activation time each day and/or at the same or varying intervals.

The operations at block 610 may be performed using the alarm-clock module 305 described with reference to FIG. 3, among others.

At block 615, the method 600 may determine an adjustment time to automatically adjust a temperature setting based at least in part on the temperature adjustment time and/or the alarm activation time. For example, the specific room linked to the alarm activation time may have a predetermined temperature change over a period of time. The setting may be measured in degrees per minute, among other intervals. In some embodiments, each room may have a different determined adjustment time based on location of the room, size of the room, position relative to other rooms each having a specific temperature, some combination, and/or other factors. Determining the adjustment time may include determining the total degree change desired by the user. The adjustment time may then be set a predetermined time prior to the user's waking time.

At block 620, the method 600 may include automatically adjusting a temperature setting based at least in part on the adjustment time. At a predetermined time prior to the waking time, the method 600 may adjust the temperature setting for a room. The temperature of the room may then adjust to a desired user (or other) setting when the user's alarm-clock is activated—making waking easier and more comfortable for the user.

The operations at blocks 615, 620 may be performed using the activation module 315 described with reference to FIG. 3.

Thus, the method 600 may provide for alarm-clock activated systems relating to automation/security systems. It should be noted that the method 600 is just one implementation and that the operations of the method 600 may be rearranged or otherwise modified such that other implementations are possible. In some embodiments, method 600 may include, omit, and/or other be otherwise combined with other methods disclosed, such as methods 700 and 800, among others.

Figure 7:
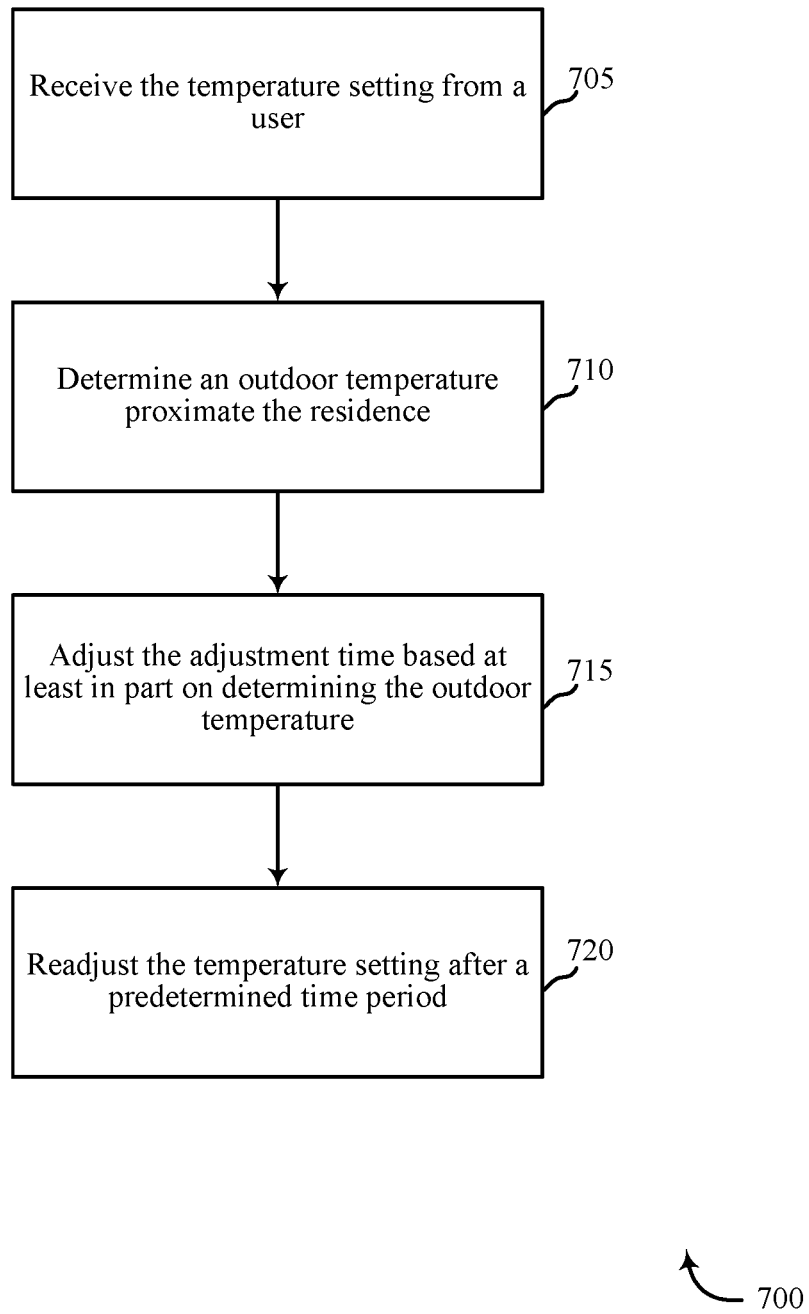
FIG. 7 is a flow chart illustrating an example of a method relating to a security and/or an automation system, in accordance with various aspects of this disclosure.

FIG. 7 is a flow chart illustrating an example of a method 700 for alarm-clock triggered systems, in accordance with various aspects of the present disclosure. For clarity, the method 700 is described below with reference to aspects of one or more of the devices 205 described with reference to FIGS. 2-5. In some examples, a backend server may execute one or more sets of codes to control the functional elements of the device 205 to perform the functions described below. Additionally or alternatively, the device 205 may perform one or more of the functions described below using special-purpose hardware and/or software.

At block 705, the method 700 may receive the temperature setting from the user. The temperature setting may be a recurring setting the user wishes to wake up to every day. In another embodiment, the temperature setting may be input by the user each time the user sets an alarm or may be learned based on the user's inputs over a period. If the user has a recurring weekly alarm, e.g. an alarm for the week-day, that does not readily change, the method 700 may ping the user on a recurring basis to ensure the desired temperature setting has not changed. For example, the method 700 may ping the user for any potential updates to a waking temperature every week, every bi-week, every month, every other month, or some other interval. The user may wish to update the waking temperature based on seasonal or external temperature changes.

The operations at block 705 may be performed using the alarm-clock module 305 and/or the adjustment module 310 described with reference to FIG. 3, among others.

At block 710, the method 700 may determine an outdoor temperature proximate the residence. At block 715, the method 700 may adjust the adjustment time based at least in part on determining the outdoor temperature. For example, the temperature adjustment time may change based on external temperatures to the residence. If the user wishes to wake to a warm temperature but the external temperature is cold, the room may take longer to reach the desired temperature time. In some embodiments, one or more components of the method 700 may have a repository of information on the impact of external temperatures on the temperature changes in the room. In other embodiments, the method 700 may mathematically calculate the adjustment to the adjustment time. In some embodiments, one or more components of the method 700 may have a repository of information based on the previous impact of external temperatures on the temperature changes in the room of the particular residence, nearby residences, residences of similar size (or other similarity and/or characteristic, such as orientation), some combination, and/or other information.

The operations at blocks 710 and 715 may be performed using the adjustment module 310 described with reference to FIG. 3, among others.

At block 720, the method 700 may readjust the temperature setting after a predetermined time period. The predetermined time period may be set by the user or may be determined by the method 700 in accordance with a departure (or another time) time related to the user. For example, the method 700 may automatically lower a temperature setting in colder months to save energy after a detected user and/or others have exited the residence. The user may also wish to lower a temperature in colder months after the user has woken and prepared for the day. Conversely, the method 700 may automatically raise a temperature of an air conditioning system in warmer months to reduce energy output.

The operations at block 720 may be performed using the activation module 315 described with reference to FIG. 3, among others.

Thus, the method 700 may provide for alarm-clock activated systems relating to automation/security systems. It should be noted that the method 700 is just one implementation and that the operations of the method 700 may be rearranged or otherwise modified such that other implementations are possible. In some embodiments, method 700 may include, omit, and/or other be otherwise combined with other methods disclosed, such as methods 600 and 800, among others.

Figure 8:
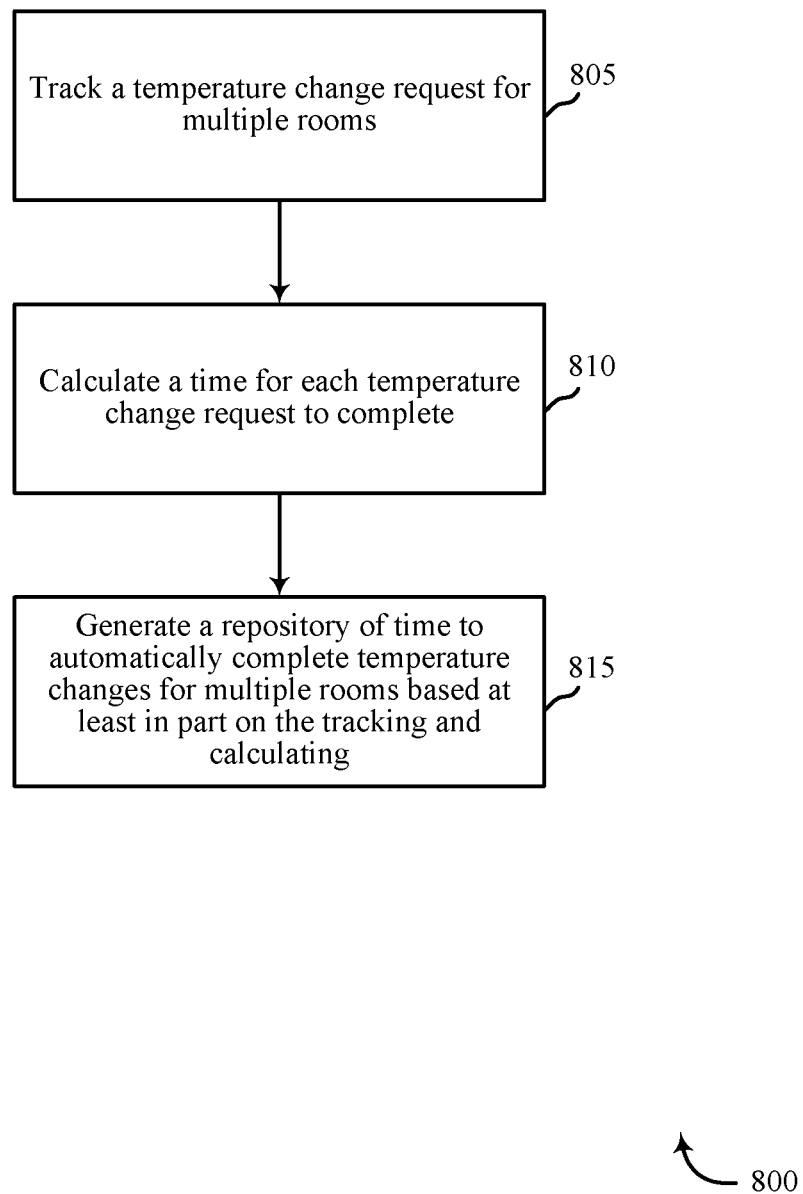
FIG. 8 is a flow chart illustrating an example of a method relating to a security and/or an automation system, in accordance with various aspects of this disclosure.

FIG. 8 is a flow chart illustrating an example of a method 800 for alarm-clock triggered systems, in accordance with various aspects of the present disclosure. For clarity, the method 800 is described below with reference to aspects of one or more of the devices 205 described with reference to FIGS. 2-5. In some examples, a backend server may execute one or more sets of codes to control the functional elements of the device 205 to perform the functions described below. Additionally or alternatively, the device 205 may perform one or more of the functions described below using special-purpose hardware and/or software.

At block 805, the method 800 may track a temperature change request for multiple rooms. In some embodiments, the temperature change request may different and/or the same for each room and/or may be tracked in according with an overall delta between the current temperature setting, the new setting, and/or an external temperature setting. Tracking the temperature change request may then include tracking a total time period for each room to reach the desired temperature setting. At block 810, the method 800 may calculate a time for each temperature change request to be complete. This may include a total time that a specific room takes to reach a desired user temperature setting. In some embodiments, each temperature change request may be based on separate alarm times and/or temperature setting each relating to a different user, device, room, some combination, and/or other information.

At block 815, the method 800 may then generate a repository of time to automatically complete temperature changes for multiple rooms based at least in part on the tracking and calculating. The repository of information may enable the method 800 to efficiently and properly change the temperature at a correct time to ensure the desired temperature is achieved in one or more particular rooms by a desired time.

The operations at blocks 805, 810, 815 may be performed using the adjustment module 310 described with reference to FIG. 3, among others.

Thus, the method 800 may provide for alarm-clock activated systems relating to automation/security systems. It should be noted that the method 800 is just one implementation and that the operations of the method 800 may be rearranged or otherwise modified such that other implementations are possible. In some embodiments, method 700 may include, omit, and/or other be otherwise combined with other methods disclosed, such as methods 600 and 800, among others.

In some examples, aspects from two or more of the methods 600, 700, and 800 may be combined and/or separated. It should be noted that the methods 600, 700, and 800 are just example implementations, and that the operations of the methods 600, 700, and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system, comprising:
   identifying, by a control panel, an alarm activation time of an alarm device associated with a user;
   receiving, by the control panel, data about at least one previous wake time of the user collected by one or more sensors;
   predicting, by the control panel, a wake time of a user based at least in part on identifying the alarm activation time and receiving the data collected by the one or more sensors about the at least one previous wake time of the user;
   tracking, by the control panel, a duration to transition a room between temperatures;
   determining, by the control panel, an adjustment time to automatically adjust a temperature of the room based at least in part on the predicted wake time of the user and the duration to transition between the temperatures; and
   automatically adjusting, by the control panel, a temperature setting of a heating ventilation and air conditioning (HVAC) system associated with the room at the adjustment time.

2. The method of claim 1, further comprising:
   identifying an appointment on a calendar of the user, wherein predicting the wake time of the user is based at least in part on identifying the appointment.

3. The method of claim 1, further comprising:
   identifying the at least one previous wake time of the user, wherein predicting the wake time of the user is based at least in part on identifying the at least one previous wake time.

4. The method of claim 3, wherein the at least one previous wake time occurs when an alarm mode of the alarm device is inactive.

5. The method of claim 1, further comprising:
   determining a second adjustment time to activate a device based on the adjustment time to adjust the temperature of the room; and
   automatically activating the device at the second adjustment time.

6. The method of claim 5, wherein the device comprises a coffee-pot, a lock on a door, a lock on a dog-door, a television, or a shower, or a combination thereof.

7. The method of claim 1, further comprising:
   receiving waking alarm information from the alarm device; and
   detecting the alarm activation time based at least in part on receiving the waking alarm information.

8. The method of claim 1, further comprising:
   determining an outdoor temperature in proximity with the room, wherein determining the adjustment time is based at least in part on determining the outdoor temperature.

9. The method of claim 1, further comprising:
   determining a second adjustment time for a second room based at least in part on the adjustment time for the room, the second adjustment time being after the adjustment time; and
   automatically adjusting the temperature setting of the HVAC system associated with the room for the second room at the second adjustment time.

10. The method of claim 1, further comprising:
    determining a time for the room to reach a desired temperature, wherein determining the adjustment time is based at least in part on determining the time for the room to reach the desired temperature.

11. The method of claim 1, further comprising:
    detecting a second alarm activation time on a second alarm device;
    determining a second adjustment time to automatically adjust the temperature of the room based at least in part on detecting the second alarm activation time and determining the adjustment time; and
    automatically adjusting the temperature setting of the HVAC system associated with the room at the second adjustment time.

12. An apparatus for a security and/or automation system, comprising:
    a processor;
    memory in electronic communication with the processor; and
    instructions stored in the memory, the instructions being executable by the processor to:
      identify an alarm activation time of an alarm device associated with a user;
      receive data about at least one previous wake time of the user collected by one or more sensors;
      predict a wake time of a user based at least in part on identifying the alarm activation time and receiving the data collected by the one or more sensors about the at least one previous wake time of the user;
      track a duration to transition a room between temperatures;

determine an adjustment time to automatically adjust a temperature of the room based at least in part on the predicted wake time of the user and the duration to transition between the temperatures; and automatically adjust a temperature setting of a heating ventilation and air conditioning (HVAC) system associated with the room at the adjustment time.

13. The apparatus of claim 12, wherein the instructions are further executable to:

identify an appointment on a calendar of the user, wherein predicting the wake time of the user is based at least in part on identifying the appointment.

14. The apparatus of claim 12, wherein the instructions are further executable to:

identify the at least one previous wake time of the user, wherein predicting the wake time of the user is based at least in part on identifying the at least one previous wake time.

15. The apparatus of claim 12, wherein the instructions are further executable to:

determine a second adjustment time to activate a device based on the adjustment time to adjust the temperature of the room; and automatically activate the device at the second adjustment time.

16. The apparatus of claim 12, wherein the instructions are further executable to:

receive waking alarm information from the alarm device; and detect the alarm activation time based at least in part on receiving the waking alarm information.

17. A non-transitory computer-readable medium storing computer-executable code, the code executable by a processor to:

identify an alarm activation time of an alarm device associated with a user;

receive data about at least one previous wake time of the user collected by one or more sensors;

predict a wake time of a user based at least in part on identifying the alarm activation time and receiving the data collected by the one or more sensors about the at least one previous wake time of the user;

track a duration to transition a room between temperatures;

determine an adjustment time to automatically adjust a temperature of the room based at least in part on the predicted wake time of the user and the duration to transition between the temperatures; and automatically adjust a temperature setting of a heating ventilation and air conditioning (HVAC) system associated with the room at the adjustment time.

18. The computer-readable medium of claim 17, wherein the code is further executable to:

identify an appointment on a calendar of the user, wherein predicting the wake time of the user is based at least in part on identifying the appointment.

19. The computer-readable medium of claim 17, wherein the code is further executable to:

identify the at least one previous wake time of the user, wherein predicting the wake time of the user is based at least in part on identifying the at least one previous wake time.

20. The computer-readable medium of claim 17, wherein the code is further executable to:

determine a second adjustment time to activate a device based on the adjustment time to adjust the temperature of the room; and automatically activate the device at the second adjustment time.

\* \* \* \* \*